United States Patent Office 2,749,353
Patented June 5, 1956

2,749,353
SUBSTITUTED BENZ [CD] INDOLINES

Edmund C. Kornfeld and Eugene J. Fornefeld, Indianapolis, Ind., assignors to Eli Lilly and Company, Indianapolis, Ind., a corporation of Indiana No Drawing. Application August 1, 1952,
Serial No. 302,235

7 Claims. (Cl. 260—319)

This invention relates to novel organic compounds and more particularly to substituted benz [cd] indolines and their preparation.

The benz [cd] indolines of this invention are represented by the following formula:

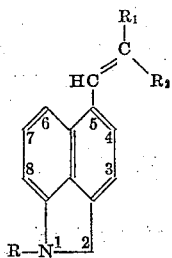

wherein R represents an aliphatic acyl, or a monocyclic aroyl radical, $R_1$ represents a cyano, carboxy, carboxyalkyl or N-methyl thioamido radical and $R_2$ represents a cyano radical when $R_1$ represents a cyano, carboxyalkyl or N-methylthioamido radical, and $R_2$ represents hydrogen or a cyano group when $R_1$ is a carboxy radical.

The new substituted indolines are prepared by the reaction of a compound containing an active methylene group with an N-substituted-5-formyl-benz [cd] indoline. The N-substituted-5-formylbenz [cd] indolines which are intermediates in the preparation of the compounds of the present invention are described in the co-pending application of Edmund C. Kornfeld, Ser. No. 299,225, filed July 16, 1952.

The following series of equations, in which R represents an aliphatic acyl or a monocyclic aroyl radical, illustrates the preparation of representative compounds of this invention.

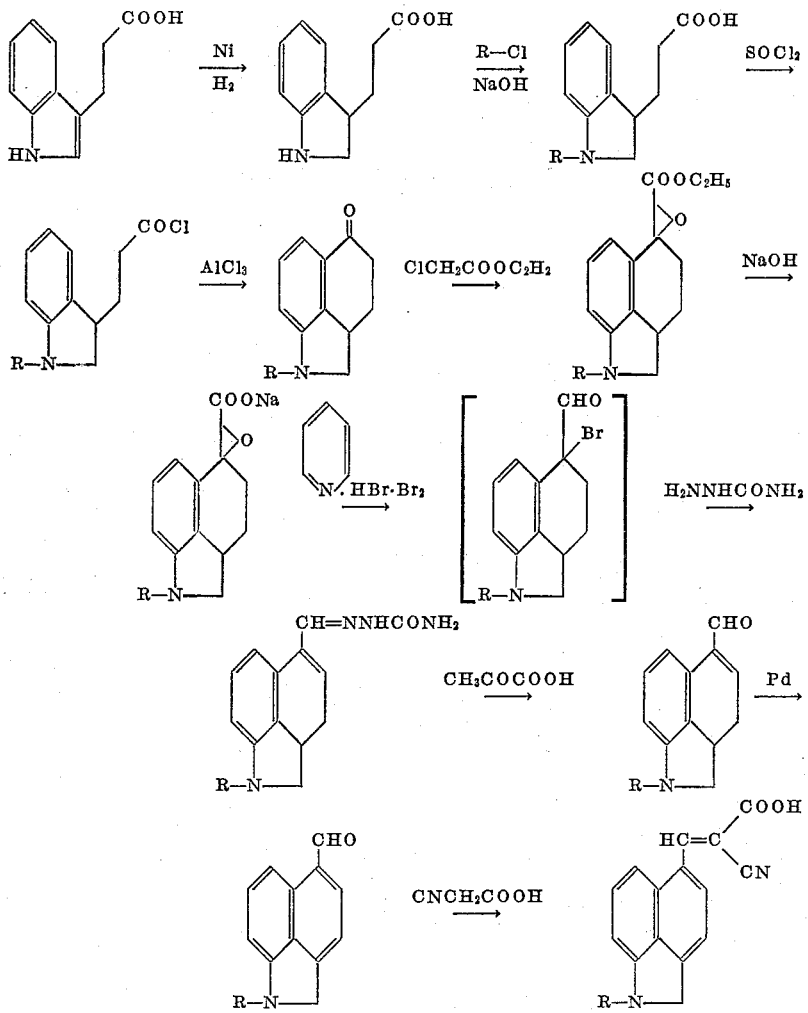

Referring to the foregoing series of reactions, indole-3-3 propionic acid is hydrogenated and reacted with an acyl halide to form the corresponding acylated hydrogenated compound, which upon reaction with thionyl chloride, followed by cyclization with aluminum chloride is converted to an N-acyl-5-keto-1,2,2a,3,4,5-hexahydrobenz [cd] indole. The hexahydrobenz [cd] indole upon treatment with a chloroacetic acid ester in a Darzen's type of reaction produces a glycidic ester which is readily hydrolyzed to the sodium salt form of the glycidic acid. Reaction of the sodium salt with pyridine hydrobromide perbromide, and treatment of the intermediate bromoaldehyde (not isolated) with semicarbazide yields a semicarbazone of an N-acyl-5-formyl-1,2,2a,3-tetrahydrobenz [cd] indole. The [cd] indole is subjected to the action of pyruvic acid to form N-acyl-5-formylbenz [cd] indole.

The indole is dehydrogenated with palladium to produce an N-acyl-5-formylbenz [cd] indoline, which latter compound upon reaction with cyanoacetic acid produces α-cyano-β-(5-N-acylbenz [cd] indolinyl) acrylic acid.

It is to be understood that the above series of reactions is illustrative only, and obvious modifications will be apparent to those skilled in the art. Thus, for example, although certain of the reactions as illustrated employ particular acyl halides or specific carboxylic acid esters, other equivalent halides and esters can be employed.

The compounds of the invention are useful intermediates in the synthesis of compounds having the ring system of ergot alkaloids, such as lysergic acid and closely related substances. Thus reduction of the cyano group of alkyl α-cyano-β-(N-acylbenz [cd] indolyinyl) acrylates and α-cyano-β-(N-acylbenz [cd] indolinyl) acrylonitriles, followed by cyclization and hydrolysis, affords derivatives of nor-lysergic acid, which on methylation are converted to acyl derivatives of lysergic acid. Removal of the acyl group produces lysergic acid. Similarly, N-methyl-α-cyano-β-(5-N-acylbenz [cd] indolinyl) thioacrylamides can be desulfurized with Raney nickel catalyst to the corresponding secondary amines which on hydrolysis and cyclization yield lysergic acid.

The following examples further illustrate the preparation of the new compounds of this invention.

*Example 1*

A mixture of 118 g. (0.4 mol) of N-benzoylindoline-3-propionic acid, prepared according to the method of Robinson (J. Chem. Soc. 1931, 3158), and 200 ml. of thionyl chloride was allowed to stand at room temperature for one half hour and was warmed on a steam bath for about twenty minutes. The excess thionyl chloride was evaporated in vacuo, and the residue comprising N-benzoylindoline-3-propionyl chloride was dissolved in 200 ml. of dry carbon disulfide. The solution was added in a thin stream to a vigorously stirred suspension of 240 g. of aluminum chloride in 1750 ml. of carbon disulfide. The mixture was refluxed and stirred for about one hour, and was then treated with a mixture of 500 g. of ice, 250 ml. of concentrated hydrochloric acid, and 500 ml. of water. The mixture was stirred during the addition of the ice mixture and was cooled by intermittently distilling a portion of the carbon disulfide in vacuo. After addition of all of the ice mixture, the carbon disulfide remaining was distilled in vacuo and the aqueous residue was extracted with 2 l. of benzene. The benzene extract was dried over magnesium sulfate and evaporated in vacuo to a small volume. Several volumes of petroleum ether were added slowly to the concentrate whereupon a yellow crystalline precipitate of N-benzoyl-5-keto-1,2,2a,3,4,5-hexahydrobenz[cd]indole separated. The precipitate was filtered off, washed with petroleum ether, and recrystallized from benzene-petroleum ether mixture. After recrystallization from benzene-petroleum ether mixture, it melted at about 146–147° C.

*Analysis.*—Calculated for $C_{15}H_{15}NO_2$: C, 77.96; H, 5.45; N, 5.05. Found: C, 78.15; H, 5.32; N, 5.15.

32.4 g. (0.83 gram atom) of potassium were dissolved in a mixture of 800 ml. of dry tertiary butanol and 700 ml. of dry benzene maintained under nitrogen. The solvents were removed in vacuo, and the potassium t-butoxide was suspended in 1500 ml. of a mixture of equal volumes of dry benzene and dry toluene. The mixture was maintained under an atmosphere of nitrogen, and cooled in an ice bath, and to it were added 136 g. (0.49 mol) of N-benzoyl-5-keto-1,2,2a,3,4,5-hexahydrobenz[cd]indole. To the mixture while being cooled in the ice bath 106 g. (0.86 mol) of ethyl chloroacetate were added dropwise with stirring over a period of ten minutes. The cold solution was stirred for fifteen minutes, was warmed to room temperature and stirred for fifteen minutes, and finally was heated and refluxed for fifteen minutes. The mixture was cooled rapidly and treated with a few hundred grams of ice. The aqueous layer was separated, and the organic layer was washed successively with 1 l. of water, 1 l. of 1.5 N sulfuric acid, 1 l. of 0.7 N sulfuric acid, 1 l. of water and 1 l. of saturated sodium bicarbonate solution. The solution was dried over anhydrous magnesium sulfate, and the solvents were evaporated in vacuo. The syrupy glycidic ester remaining was dissolved in 1200 ml. of absolute ethanol, and to the solution were added slowly with shaking 65 ml. of 12.5 N sodium hydroxide solution. The mixture was allowed to stand for twenty minutes after which it was heated rapidly to 70–75° and held there for five minutes, and then cooled for about one hour. The sodium β-5-(N-benzoyl-1,2,2a,3,4,5-hexahydrobenz[cd]-indolyl) glycidate which separated was filtered off, washed with methanol and ether, and dried. The yield was 124 g., 71 percent of theory. The salt melted with decomposition at about 220–223° C. A sample prepared for analysis by recrystallization from a mixture of methanol and ether gave the following analysis:

*Analysis.*—Calculated for $C_{20}H_{26}NO_4Na$: N, 3.92; Na, 6.44. Found: N, 3.85; Na, 6.65.

5 g. (0.014 mol) of sodium β-5-(N-benzoyl-1,2,2a,3,4,5-hexahydrobenz[cd]indolyl) glycidate was mixed with 100 ml. of dimethylformamide. To the mixture were added 4.5 g. (0.014 mol) of pyridine hydrobromide perbromide. The mixture was warmed to 60° and was then allowed to stand at room temperature for three and one-half hours. To it was added a previously prepared solution of 4.2 g. of semicarbazide hydrochloride and 3.6 g. (0.042 mol) of anhydrous sodium acetate in 35 ml. of dimethyl formamide, and the mixture was heated on a steam bath for one hour. The dimethylformamide was evaporated in vacuo, the dark syrupy residue was treated with water, and the amorphous product which separated was filtered off, and washed well with water. The precipitate was dissolved in a minimum of hot glacial acetic acid, the solution was treated with decolorizing carbon, and diluted with two volumes of methanol. After chilling to about 5° C. for a few hours a crystalline precipitate of the semicarbazone of N-benzoyl-5 - formyl - 1,2,2a,3 - tetrahydrobenz[cd]indole separated. The precipitate was filtered off and washed with small amounts of methanol and ether. The yield was 2.95 g., 61 percent of theory. It melted with decomposition at about 232–233° C.

*Analysis.*—Calculated for $C_{20}H_{18}N_4O_2$: C, 69.35; H, 5.24; N, 16.18. Found: C, 69.15; H, 5.24; N, 16.20.

The use of acetic acid as a solvent in the above reaction in place of dimethyl formamide yields the same product in somewhat smaller yield.

22.9 g. of the semicarbazone of N-benzoyl-5-formyl-1,2,2a,3-tetrahydrobenz[cd]indole were mixed with 160 g. of redistilled pyruvic acid, 230 ml. of chloroform and 10 ml. of water. The solution was shaken until homogeneous and allowed to stand for three hours. It was diluted with 200 ml. of chloroform and washed with three 300 ml. portions of water and with two 300 ml. portions of saturated sodium bicarbonate solution. The chloroform solution was dried over anhydrous magnesium sulfate, treated with decolorizing carbon, and concentrated to dryness in vacuo. The crystalline residue of N-benzoyl-5-formyl-1,2,2a,3-tetrahydrobenz[cd]indole was digested with 100 ml. of hot ethanol, cooled, filtered, and washed with methanol and ether. The yield was 16.1 g., 85 percent of theory. It melted at about 171–174° C. After recrystallization of a sample from ethanol, it melted at about 177–178° C.

*Analysis.*—Calculated for $C_{19}H_{15}NO_2$: C, 78.87; H, 5.23; N, 4.84. Found: C, 78.29; H, 5.73; N, 4.44.

A solution of 2 g. of N-benzoyl-5-formyl-1,2,2a,3-tetrahydrobenz[cd]indole in 30 cc. of dry toluene was refluxed with 3.0 g. of 5 percent palladium on carbon for about two hours. The catalyst was removed by filtration and extracted twice with hot chloroform. The filtrate and washings were combined and evaporated to dryness in vacuo. The residue, consisting of N-benzoyl-5-formylbenz[cd]indoline, was crystallized from benzene-petroleum ether and recrystallized from methanol.

N-benzoyl-5-formylbenz[cd]indoline thus prepared melted at about 165–168° C.

*Analysis.*—Calculated for $C_{19}H_{13}NO_2$: C, 79.40; H, 4.53; N, 4.88. Found: C, 79.10; H, 4.99; N, 5.18.

A mixture of 29.5 g. of cyanoacetic acid and 210 ml. of dihydropyran was allowed to stand for about two hours and then 10 g. of N-benzoyl-5-formylbenz[cd]indoline, 23.15 g. of ammonium acetate, 20.2 ml. of acetic anhydride and 10 ml. of acetic acid were added. The reaction mixture was allowed to stand overnight at room temperature and two volumes of chloroform were added. The resulting solution was washed well with water and dried over anhydrous magnesium sulfate. The chloroform was evaporated under reduced pressure and the residue was crystallized from methanol. The α-cyano-β-(5-N-benzoylbenz[cd]indolinyl) acrylic acid thus prepared and crystallized at about 222–226° C. with decomposition, and upon recrystallization from a mixture of dimethylformamide and methanol, melted at about 231–233° C. with decomposition.

*Analysis.*—Calculated for $C_{22}H_{14}N_2O_3$: C, 74.57; H, 3.98; N, 7.91. Found: C, 74.55; H, 4.55; N, 7.88.

Example 2

A mixture of 1 g. of N-benzoyl-5-formylbenz[cd]indoline, 3.6 g. of malonic acid, 10 ml. of pyridine and 0.5 ml. of piperidine was heated on a steam bath for about two hours. The solution was chilled, and the resulting precipitate of β-(5-N-benzoylbenz[cd]indolinyl) acrylic acid was filtered off and dried. On recrystallization from a mixture of dimethylformamide and ethanol, β-(5-N-benzoylbenz[cd]indolinyl) acrylic acid melted at about 290° C. with decomposition.

*Analysis.*—Calculated for $C_{21}H_{15}NO_3$: C, 76.70; H, 4.56; N, 4.36. Found: C, 76.54; H, 4.81; N, 4.50.

Example 3

A mixture of about 5.0 g. of N-benzoyl-5-formylbenz[cd]indoline, 15 g. of t-butylcyanoacetate, 11.5 g. of ammonium acetate, 5 ml. of acetic acid, 10 ml. of acetic anhydride and 100 ml. of benzene was refluxed for about 10 hours. About two volumes of chloroform were added, and the solution was washed well with water, and dried over anhydrous magnesium sulfate. The dried solution was evaporated and the residue, containing the t-butyl-α-cyano-β-(5-N-benzoylbenz[cd]indolinyl) acrylate, was crystallized from ethanol. t-Butyl-α-cyano-β-(5-N-benzoylbenz[cd]indolyl) acrylate thus prepared melted at about 210° C. with decomposition.

*Analysis.*—Calculated for $C_{24}H_{22}N_2O_3$: C, 76.08; H, 5.40; N, 6.83. Found: C, 75.95; H, 5.80; N, 7.10.

Example 4

The procedure of Example 3 was followed, except that 15 g. of ethylcyanoacetate were used.

Ethyl-α-cyano-β-(5-N-benzoylbenz[cd]indolyl) acrylate thus prepared melted at about 210–211° C.

*Analysis.*—Calculated for $C_{24}H_{18}N_2O_3$: C, 75.40; H, 4.74; N, 7.32. Found: C, 75.86; H, 5.41; N, 7.60.

Example 5

To a solution of 1500 ml. of liquid methylamine in 600 ml. of cold water was added one liter of ethylcyanoacetate, over a period of one-half hour, and with cooling to maintain the temperature at about 10 to 15° C. The reaction mixture was further stirred for about one hour at 5° C. and for about one hour at room temperature. Thereafter, the reaction mixture was evaporated to small volume in vacuo, and the cyanoacetomethylamide formed in the reaction was crystallized from a mixture of 600 ml. of methanol and 1500 ml. of ether; cyanoacetomethylamide thus prepared melted at about 98°–100° C.

A mixture of 98 g. of cyanoacetomethylamide, 100 g. of phosphorus pentasulfide and 1750 ml. of xylene was stirred and gradually heated to refluxing over a period of twenty-five minutes. Refluxing was continued for about fifteen minutes, after which time the hot solution was decanted from the sludge. The residue was extracted with about 500 ml. of hot xylene, and the combined xylene extract and original xylene solution were concentrated in vacuo to about 1500 ml. and diluted with 500 ml. of petroleum ether. A precipitate of crude cyanothioacetomethylamide formed, and was filtered off. The precipitate was dissolved in one liter of hot benzene, the benzene solution was treated with decolorizing carbon and concentrated in vacuo to about 350 ml. The concentrated benzene solution was diluted with an equal volume of petroleum ether, whereupon pure cyanothioacetomethylamide was precipitated, filtered off and dried.

Cyanothioacetomethylamide thus prepared melted at about 68–69° C.

*Analysis.*—Calculated for $C_4H_6N_2S$: N, 24.54; S, 28.09. Found: N, 24.80; S, 28.15.

A mixture of 1 g. of N-benzoyl-5-formylbenz[cd]indoline, 3.9 g. of cyanothioacetomethylamide, 2.3 g. of ammonium acetate, 1.05 g. of glacial acetic acid, 2.16 g. of acetic anhydride and 30 ml. of benzene was heated on a steam bath for about two hours. About two volumes of chloroform were added to the reaction mixture, the solution was washed with water and dried over anhydrous magnesium sulfate. The chloroform solution was evaporated to small volume, and the residue was digested with a small amount of warm methanol, whereupon a granular precipitate of N-methyl-α-cyano-β-(5-N-benzoylbenz[cd]indolinyl) thioacrylamide formed in the reaction. The precipitate was removed by filtration, dried and crystallized from methanol. N-methyl-α-cyano-β-(5-N-benzoylbenz[cd]indolinyl) thioacrylamide thus prepared formed bright yellow crystals melting at about 241.5–242.5° C. with decomposition.

*Analysis.*—Calculated for $C_{23}H_{17}ON_3S$: N, 10.96. Found: N, 10.75.

Example 6

N-acetylindoline-3-propionic acid was prepared by the reduction and acetylation of indole-3-propionic acid.

A mixture of 23.3 g. (0.1 mol) of N-acetylindoline-3-propionic acid and 50 ml. of pure thionyl chloride was allowed to stand for one-half hour at room temperature and thereafter was warmed for about twenty minutes on a steam bath. The excess of thionyl chloride was removed by evaporation in vacuo. The residue was dissolved in 50 ml. of dry nitrobenzene, and the nitrobenzene solution was added in a thin stream to a vigorously stirred suspension of 60 g. of anhydrous aluminum chloride in 150 ml. of nitrobenzene, the reaction mixture being cooled externally to maintain the reaction temperature at about 10° to 20° C. The mixture was then stirred and heated at 50° C. for about three hours and allowed to stand at room temperature for a few hours. The reaction mixture was cooled to 20° C. and decomposed by the slow addition of a mixture of 100 g. of crushed ice, 100 ml. of concentrated hydrochloric acid, and 200 ml. of water. The lower nitrobenzene layer was separated and washed with three 150 ml. portions of 2N sodium hydroxide solution, and then with water. The washed nitrobenzene layer was separated and steam distilled to remove the nitrobenzene.

The aqueous residue which contained a precipitate of N-acetyl-5-keto-1,2,2a,3,4,5-hexahydrobenz[cd]indole was filtered, and the precipitate was washed with water and dried. The dry material melted at about 174.5–176.5° C.

N - acetyl - 5 - keto - 1,2,2a,3,4,5 - hexahydrobenz[cd]- indole was treated with potassium t-butoxide and ethyl chloroacetate according to the procedure set forth in Example 1 to form sodium β-5-(N-acetyl-1,2,2a,3,4,5-hexahydrobenz[cd]indolyl) glycidate, which was further reacted with pyridine hydrobromide perbromide and semicarbazidehydrochloride to form the semicarbazone of N-acetyl-5 - formyl - 1,2,2a,3 - tetrahydrobenz[cd]indole melting at about 240–245° C. with decomposition.

The N - acetyl - 5-formyl-1,2,2a,3-tetrahydrobenz[cd]indole semicarbazone was treated with pyruvic acid to form the corresponding N-acetyl-5-formyl-1,2,2a,3-tetrahydrobenz[cd]indole according to the process of Example 1; which was refluxed with 5 percent palladium on carbon to prepare N-acetyl-5-formylbenz[cd]indoline.

A mixture of 29.5 g. of cyanoacetic acid and 210 cc. of dihydropyran was allowed to stand for about two hours and then 9 g. of N-acetyl-5-formylbenz[cd]indoline, 23.1 g. of ammonium acetate, 20.2 ml. of acetic anhydride and 10 ml. of acetic acid were added, and the reaction mixture was treated according to the procedure of Example 1.

α-Cyano-β-(5-N-acetylbenz[cd]indolinyl) acrylic acid thus prepared melted at about 240–245° C. with decomposition.

*Example 7*

A mixture of 1 g. of N-benzoyl-5-formylbenz[cd]indoline, 2.5 g. of malononitrile, 10 ml. of pyridine and 0.5 ml. of piperidine was heated on the steam bath for about two hours. The reaction mixture was cooled, and the resulting precipitate of α-cyano-β-(5-N-benzoylbenz[cd]indolinyl) acrylonitrile was removed by filtration and recrystallized from a mixture of dimethylformamide-ethanol.

α-Cyano-β-(5-N-benzoylbenz[cd]indolinyl) acrylonitrile melted at about 290° C. with decomposition.

*Analysis.*—Calculated for $C_{22}H_{13}N_3O$: C, 78.6; H, 3.87; N, 12.5. Found: C, 76.4; H, 4.31; N, 13.8.

We claim:

1. A compound represented by the formula

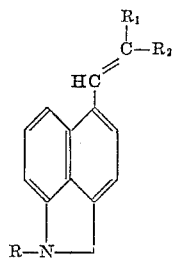

wherein R represents a member of the group consisting of lower alkanoyl and monocarbocyclic aroyl radicals, and $R_1$ represents a member of the group consisting of cyano, carboxy, lower carboxyalkyl and N-methylthioamido radicals, $R_2$ represents a cyano radical when $R_1$ represents a member of the group consisting of cyano, lower carboxyalkyl and N-methylthioamido radicals, and $R_2$ represents a member of the group consisting of hydrogen and a cyano radical when $R_1$ represents a carboxy radical.

2. A compound represented by the formula

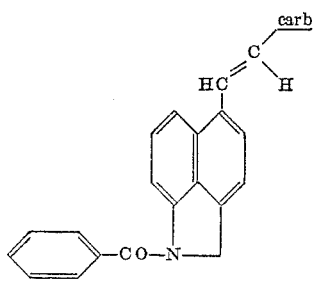

wherein carb represents a lower carboxyalkyl radical.

3. α-Cyano-β-(5-N-benzoylbenz[cd]indolinyl acrylic acid represented by the formula

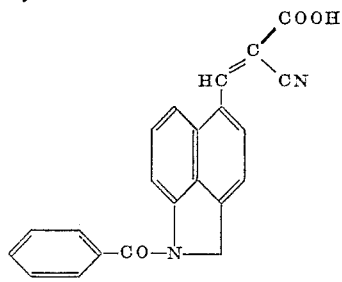

4. t-Butyl-α-cyano-β-(5-N-benzoylbenz[cd]indolinyl acrylate represented by the formula

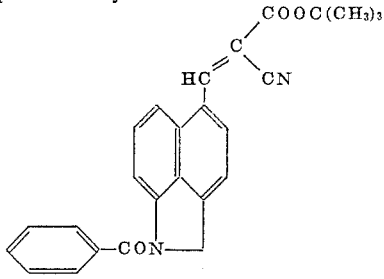

5. α-Cyano-β-(5-N-benzoylbenz[cd]indolinyl) acrylonitrile represented by the formula

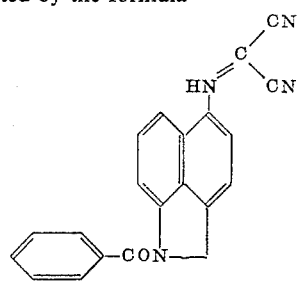

6. β-(5-N-benzoylbenz[cd]indolinyl) acrylic acid represented by the formula

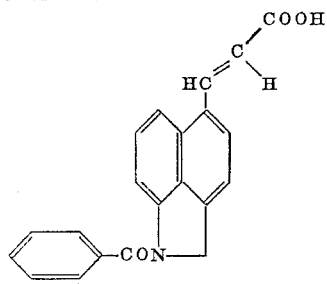

7. Ethyl α-cyano-β-(5-N-benzoylbenz[cd]indolinyl) acrylate represented by the formula

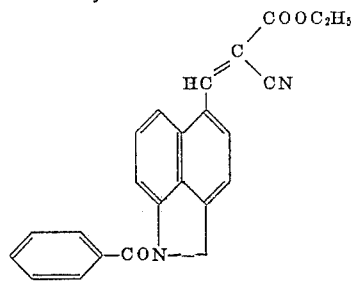

References Cited in the file of this patent
UNITED STATES PATENTS
2,663,714   Kornfeld _____ Dec. 22, 1953
OTHER REFERENCES
Helv. Chim. Acta., vol. 33, page 2258 (1950).
Helv. Chim. Acta., vol. 35, page 150 (1952).